United States Patent
Swoboda et al.

(10) Patent No.: US 7,758,025 B2
(45) Date of Patent: Jul. 20, 2010

(54) APPARATUS FOR AIR TREATMENT AND SURFACE TREATMENT INSTALLATION HAVING THE SAME

(75) Inventors: Werner Swoboda, Boeblingen (DE); Kersten Link, Grafenau (DE)

(73) Assignee: Eisenmann Anlagenbau GmbH & Co KG, Boeblingen (DE)

( * ) Notice: Subject to any disclaimer, the term of this patent is extended or adjusted under 35 U.S.C. 154(b) by 731 days.

(21) Appl. No.: 11/473,379

(22) Filed: Jun. 22, 2006

(65) Prior Publication Data
US 2006/0290014 A1 Dec. 28, 2006

(30) Foreign Application Priority Data
Jun. 23, 2005 (DE) ............... 10 2005 029 148

(51) Int. Cl.
*B01F 3/04* (2006.01)
(52) U.S. Cl. ............... 261/29; 261/77; 261/124; 96/223; 96/234
(58) Field of Classification Search ............... 261/29, 261/36.1, 77, 78.2, 81, 91, 104, 107, 124; 55/DIG. 7, DIG. 46; 96/223, 234, 329, FOR. 175; 210/748, 808
See application file for complete search history.

(56) References Cited

U.S. PATENT DOCUMENTS

| | | | | |
|---|---|---|---|---|
| 4,701,194 A * | 10/1987 | Weyers et al. | ............... | 96/242 |
| 5,037,585 A * | 8/1991 | Alix et al. | ............... | 261/142 |
| 5,256,308 A * | 10/1993 | Dulany | ............... | 210/712 |
| 5,464,513 A * | 11/1995 | Goriachev et al. | ............... | 204/164 |
| 5,776,351 A * | 7/1998 | McGinness et al. | ............... | 210/748 |
| 5,846,425 A * | 12/1998 | Whiteman | ............... | 210/606 |
| 5,859,952 A * | 1/1999 | Levine et al. | ............... | 392/405 |
| 6,224,826 B1 * | 5/2001 | Katakura et al. | ............... | 422/20 |
| 6,395,176 B1 * | 5/2002 | Held et al. | ............... | 210/610 |
| 6,845,971 B2 * | 1/2005 | Bachert | ............... | 261/37 |
| 6,893,484 B2 * | 5/2005 | Thomas | ............... | 95/226 |
| 7,073,781 B2 * | 7/2006 | Mulvaney | ............... | 261/37 |
| 7,172,734 B1 * | 2/2007 | Joshi | ............... | 422/186 |
| 2002/0164274 A1 * | 11/2002 | Haggett et al. | ............... | 422/128 |
| 2003/0192831 A1 * | 10/2003 | Langenecker | ............... | 210/663 |
| 2006/0118495 A1 * | 6/2006 | Kondratalv et al. | ............... | 210/748 |

FOREIGN PATENT DOCUMENTS

DE 101 44 486 4/2003

OTHER PUBLICATIONS

H. Bluhm, et al. "Aufschlus and Abtötung Biologischer Zellen mit Hilfe starker gepulster elektrischer Felder," Nachrichten-Forschungszentrum Karisruhe Jahrg 35 Mar. 2003, s. 105-110.
2002/0144957A1, filed Oct. 10, 2002, for Held et al.

* cited by examiner

*Primary Examiner*—Scott Bushey
(74) *Attorney, Agent, or Firm*—Factor & Lake, Ltd.

(57) ABSTRACT

An apparatus for air treatment includes at least one reservoir which can be filled with a liquid, an air-conveying device and a device which ensures that for the treatment of the air to be treated the air comes into contact with at least a part of the liquid. A circulating device is provided, by which liquid in the reservoir is conveyed in a circuit out of the reservoir and back into the latter. For the purpose of sterilising the liquid, a device for mechanico-physical opening of cell membranes, for instance by electroporation or cavitation, is provided in the circuit. Such an apparatus can also be used for purifying exhaust air in a surface treatment installation.

6 Claims, 4 Drawing Sheets

APPARATUS FOR AIR TREATMENT AND SURFACE TREATMENT INSTALLATION HAVING THE SAME

CROSS-REFERENCE TO RELATED APPLICATIONS

Figure 1:
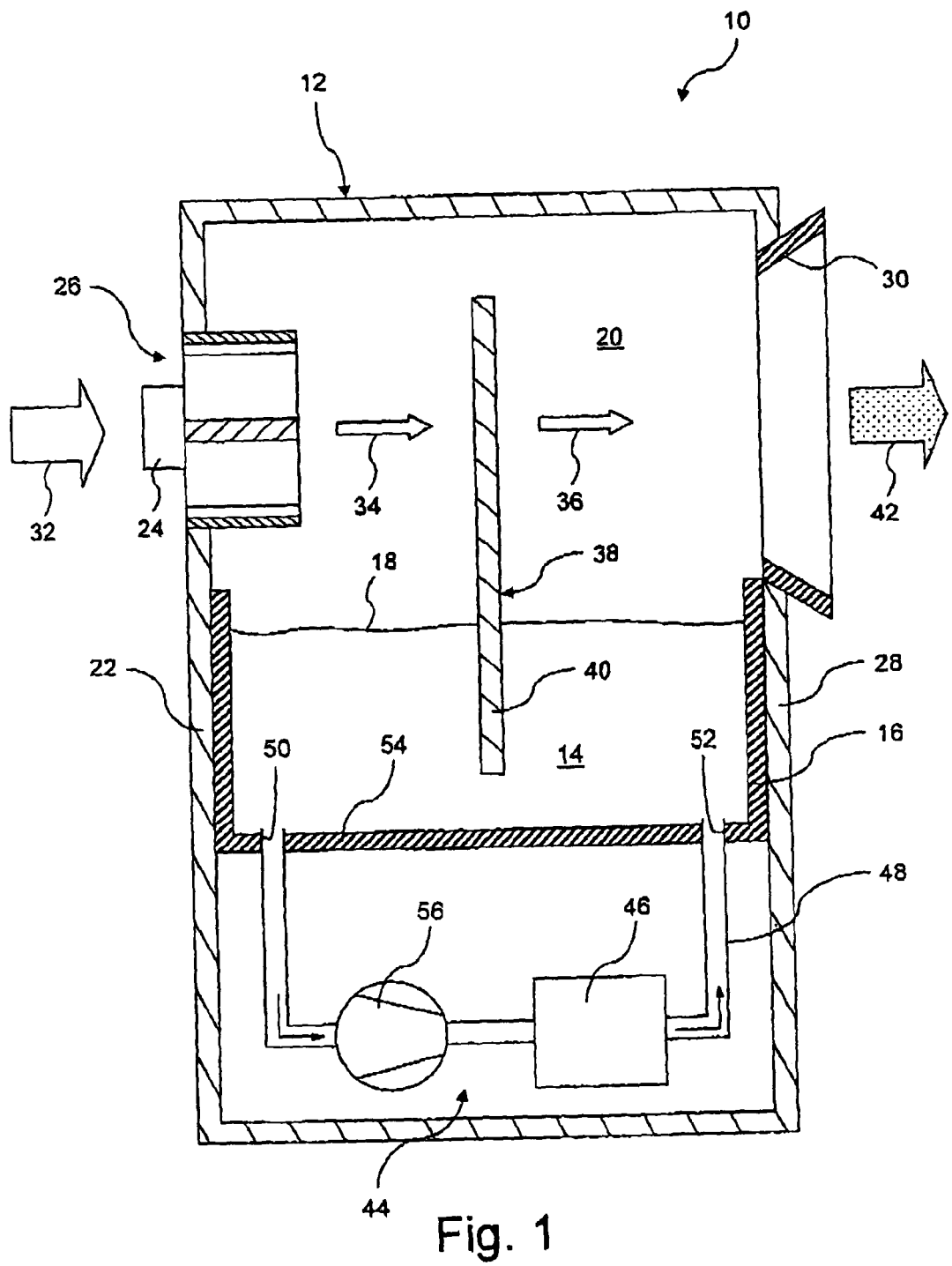

This application claims priority of German Patent Application DE 10 2005 029 148.1-16, filed Jun. 23, 2005; the contents of this application is incorporated herein by reference.

BACKGROUND OF THE INVENTION

The invention relates to an apparatus for air treatment having at least one reservoir which can be filled with a liquid; an air-conveying device; and a contact device which ensures that for the treatment of air to be treated the air comes into contact with the liquid.

The invention further relates to a surface treatment installation, in particular for painting, coating, drying and associated preparation of metallic and nonmetallic objects, having a least one treatment booth, in which there arises exhaust air laden with impurities which is at least partly fed back to the treatment booth in a circuit after prior treatment.

Apparatuses for air treatment of the above-mentioned type are known generally in the prior art, a distinction being made between air humidifiers and air purifiers.

In the case of air humidifiers, three operating principles have become established.

In so-called vaporisers, water situated in the reservoir is heated to boiling and the resulting water vapour is released to the ambient air. In so-called evaporators, water is distributed over a surface as large as possible, over which an air flow is then passed by means of a blower. The evaporation moisture is taken up by this air flow and supplied to the surroundings. Finally, air humidifiers which operate according to the atomiser principle are also known. In these, the water is atomised or nebulised, which can be done, for example, by mechanical turbulence, ultrasound or by means of fine nozzles.

A common feature of these air humidifiers operating according to different principles is that the liquid may reside in the reservoir for quite a long time. If this is the case, germs may multiply in the liquid. In the present context, germs are understood to mean not only bacteria and other protozoa but also fungi and algae.

Given unchecked multiplication, such germs may lead to odour nuisances and serious adverse effects on the health of people who breathe in the humidified air or even only come into contact with it.

Since high germ concentrations of more than $10^8$ germs per $cm^3$ may arise very quickly, biocides, which are understood to mean bactericides and fungicides, are often mixed with the liquids for sterilisation purposes.

Although the germ concentrations can be kept relatively low by such bioactively toxic substances, the costs for this type of sterilisation are high. Moreover, the biocides are additives which are often regarded by users of such air humidifiers as a nuisance in the sense that they cause unnecessary damage to health and/or the environment. A further problem with the use of chemico-biologically active biocides is the ability of numerous germs to develop resistant strains, which can be effectively combated—if at all—only with novel and therefore particularly costly means.

An air humidifier operating according to the vaporiser principle does indeed have the advantage that the water is sterilised by heating, since any germs present in the water are normally killed owing to the high temperature needed to vaporise the water. However, such a vaporiser has a high energy consumption, which is disadvantageous from an economic point of view.

As mentioned at the outset, another type of air treatment consists in air purification. Here, air laden with impurities is passed through water or another suitable purifying liquid in which the impurities readily dissolve. The air thus purified is then fed back to the surroundings by means of a blower. Especially in the case of such an air purifier, the liquid used may become heavily polluted with germs, since it is contaminated increasingly over its period of use by impurities and hence provides a good breeding ground for germs.

The maximum period of use of a liquid in an air purifier depends on its maximum uptake capacity with regard to the impurities to be taken up. Owing to the germ pollution promoted by the contamination of the liquid, however, it is usually necessary to exchange the liquid even before the end of its maximum period of use.

The treatment/purification of exhaust air is particularly relevant in connection with surface treatment installations in which wet separation occurs, as may be the case, for example, in treatment booths of surface treatment installations of the type mentioned at the outset.

The exhaust air discharged from such a treatment booth is contaminated with impurities resulting from the wet separation. Nowadays, both for ecological and economic reasons, a great deal of importance is attached to purifying in a circuit as much as possible of the exhaust air produced in the treatment booth and reusing it. It is therefore desirable to create a surface treatment installation in which an economically acceptable way is found of treating exhaust air for the purpose of recycling.

The present invention is provided to address these and other considerations.

SUMMARY OF THE INVENTION

Against the background discussed above, the object of the invention is to provide an apparatus for air treatment of the type mentioned at the outset in which a reduction of the germ concentration in the liquid used can be achieved simply and cost-effectively.

This object is achieved in that a circulating device is provided, by which liquid in the reservoir can be conveyed in a circuit out of the reservoir and back into the latter; and for the purpose of sterilising the liquid, a device for mechanico-physical opening of cell membranes is provided in the circuit.

The germs are thus not killed by chemico-biological means but are mechanically stressed in such a way that the cell membranes open irreversibly. As a result, the cytoplasm emerges from the cells, causing them to die. This type of sterilisation has the advantage that—apart from the dead biological material—no residues remain in the liquid, as is the case when it is treated with biocides. Furthermore, such a mechanical destruction of the germs can be carried out comparatively cost-effectively and efficiently. A further advantage of this approach is that the germs cannot escape the mechanico-physical sterilisation by producing resistant strains, as is possible in the chemico-biological sterilisation with the aid of biocides.

Finally, the mechanical opening of cell membranes for the purpose of sterilisation even functions when the liquid is cloudy or contains highly absorbent pigments, as may occur with special purifying liquids. This is a significant advantage over irradiation with short-wave electromagnetic radiation, for example UV light, which has also been employed hitherto for sterilisation.

The device for mechanical opening of cell membranes may, for example, be an electroporation device. The term "electroporation" refers to a method in which the cells are subjected to strong electric fields for a short time. Very fine pores already present in the cell membrane are widened under the effect of the electric field in such a way that they do not close again even when the electric field decreases. The only prerequisite for this is that the electric field has sufficient field strength and lasts for a certain minimum duration.

This type of killing of biological cells is known per se from the paper by H. Bluhm et al. entitled "Opening and killing of biological cells with the aid of strong pulsed electric fields", Nachrichten-Forschungszentrum, Karlsruhe, volume 35, 3/2003, pages 105 to 110. The focus of attention in sterilisation has hitherto been the purification of waste water from sewage treatment plants, as described, for example, in US 2002/0144957 A1. However, the killing of bacteria and other microorganisms by electroporation is more difficult than the opening of plant cells as is employed, for example, in industrial juice extractors.

The circulating device ensures that the liquid situated in the reservoir is circulated and can thus be subjected to electroporation continuously or at regular intervals of time, which is important for sufficiently effective sterilisation.

Owing to the various possible areas of use of the apparatus for air treatment, it is favourable for the operating parameters of the electroporation device to be adjustable during the operation of the apparatus. The parameters which are selectable in the electroporation, such as pulse amplitude, pulse duration, pulse frequency and pulse shape, influence the germicidal efficiency and are adaptable to the particular circumstances, for example to whether water or a purifying liquid is used and/or to the degree of contamination. Since the liquid is circulated by the circulating device continuously or intermittently, it is possible to change one or more of these parameters during the operating period of the apparatus. As a result, even very different germs can be killed.

It is helpful in particular if corona discharges can be generated in the electroporation device.

In an alternative embodiment, the device for mechanico-physical opening of cell membranes is a cavitation device which accelerates the liquid in such a way that pressure surges produced by cavitation open the cell membranes. In the case of a cavitation device, the liquid is greatly accelerated, for example, in the region of a line constriction or with the aid of an impeller wheel or the like. As a result of the great acceleration, gas bubbles are formed in the liquid and these in turn produce strong pressure surges on condensation. These pressure surges at least partly open the cell membranes of the germs, with the result that a similar effect to that with the electroporation device is achieved.

Structural realisation is simple if the contact device, which ensures that for the treatment of the air to be treated the air comes into contact with at least a part of the liquid, is formed by an evaporation surface. This is easy to achieve when the evaporation surface is a nonwoven mat or filter mat which is partially immersed in the liquid in the reservoir.

Another possibility consists in using an atomising device which atomises a part of the liquid in the reservoir.

This can be done mechanically in a simple manner by an atomising plate preferably rotating at the liquid surface. Alternatively, the liquid can be atomised by means of ultrasound or by using nozzles through which the liquid is forced by means of a pump.

Another possibility for air treatment consists in introducing air to be treated into the liquid in the reservoir by means of an air supply device in the vicinity of the bottom of the reservoir. In this case, the air is purified as it passes through the liquid by impurities entrained in the air being taken up by the liquid.

A further possibility for air purification consists in leading air to be treated through a nozzle with the liquid in the same flow direction.

A good purifying action is achieved if the air supply device comprises a multiplicity of nozzles arranged at the bottom of the reservoir.

A further object of the present invention is to provide a surface treatment installation of the type mentioned at the outset in which exhaust air which arises can be purified simply and cost-effectively.

This is achieved by a surface treatment installation of the type mentioned at the outset in which an apparatus for air treatment in the form of air purification is provided in the circuit.

Other advantages and aspects of the present invention will become apparent upon reading the following description of the drawings and detailed description of the invention.

BRIEF DESCRIPTION OF THE DRAWINGS

Exemplary embodiments of the invention are explained in more detail below with reference to the drawing, in which:

FIG. 1 shows, in partial section, a first exemplary embodiment of an apparatus for air treatment;

FIG. 2 shows, in partial section, a second exemplary embodiment of an apparatus for air treatment;

FIG. 3 shows, in partial section, a third exemplary embodiment of an apparatus for air treatment;

FIG. 4 shows, schematically, a surface treatment installation having an apparatus for air treatment; and FIG. 5 shows a simplified cross-section through an electroporation device, in which a corona discharge can be generated.

DETAILED DESCRIPTION

While the present invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 shows an air humidifier 10 as a first exemplary embodiment of an apparatus for air treatment. The air humidifier 10 comprises a housing 12, in which a reservoir 16 filled with water 14 is arranged in such a way that a gas space 20 remains above the liquid surface 18 of the water 14. An optionally present supply line for filling the reservoir 16 and a safety overflow are not illustrated.

Arranged above the liquid surface 18, in a wall 22 of the housing 12, is a blower 26 which is driven by means of an electric motor 24 and via which the gas space 20 is connected to the surroundings outside the housing.

The wall 28 of the housing 12 lying opposite the blower 26 has an opening 30 above the liquid surface 18 of the water 14.

The blower 26 is configured such that air situated outside the housing 12 and indicated by the arrow 32 is conveyed into the gas space 20 and through the latter to the opening 30.

Situated in the flow path, indicated by the arrows 34 and 36, of the air through the gas space 20 of the housing 12 is an evaporation surface 38 in the form of a nonwoven mat or filter mat, the lower end region 40 of which is immersed in the water 14. The water 14 is distributed, due to capillary forces, inside the filter mat 38. The air conveyed through the gas space 20 of the housing 12 takes up water vapour as it passes through the filter mat 38 and leaves the housing 12, humidified, through the opening 30, as indicated by an arrow 42 in FIG. 1.

Although water 14 is continually taken from the reservoir 16 during the operation of the air humidifier 10, the residence time of the water 14 in the reservoir 16 is still relatively high, so that there is a risk of germ contamination of the water 14.

To reduce this risk, a circulating device 44, into which is integrated an electroporation device 46, is provided for the purpose of sterilising the water 14.

The circulating device 44 comprises a fluid line 48 which connects an outlet 50 and an inlet 52 in the bottom 54 of the reservoir 16 to one another. A feed pump 56 is provided in the flow path of the water 14 through the line 48. The electroporation device 46 is situated in this flow path between the pump 56 and the inlet 52. The electroporation device 46 may, however, also be arranged at another location, for example in the flow direction upstream of the pump 56 or in a bypass line optionally provided specifically therefor.

Electroporation devices suitable for the purpose desired here are known per se from the prior art. In this regard, reference is made to the above-mentioned paper by H. Bluhm et al. and to DE 101 44 486 C1. The parameters which are selectable in the electroporation, such as pulse amplitude, pulse duration, pulse frequency and pulse shape, influence the germicidal efficiency and are to be adapted to the particular circumstances.

The water should be circulated continuously or at regular intervals by the circulating device 44. It is possible here to change one or more of these parameters during the operation of the air humidifier, with the result that different germs can be killed.

As a result of the electroporation, the germ density of the circulated water 14 can be reduced by several orders of magnitude to such a degree that no danger to health is to be expected.

Instead of the electroporation device 46, provision may also be made for a cavitation device, in which the water 14 is greatly accelerated, for example, in the region of a line constriction or with the aid of an impeller wheel or the like. As a result of the great acceleration, gas bubbles are formed in the water 14 and these in turn produce strong pressure surges on condensation. These pressure surges at least partly open the cell membranes of the germs, with the result that a similar effect to that with the electroporation device 46 is achieved.

Figure 2:
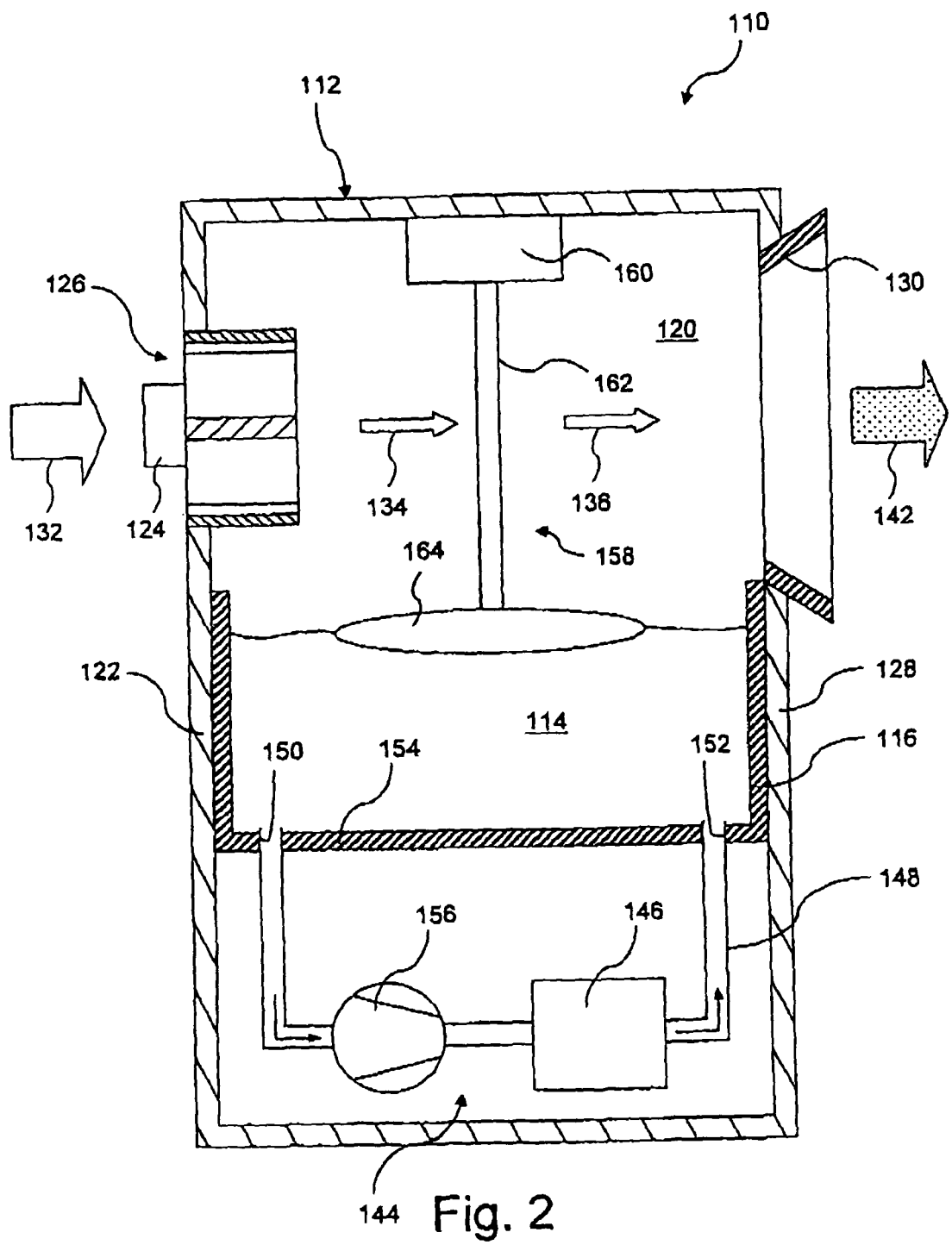

FIG. 2 shows a second exemplary embodiment of an apparatus for air treatment in the form of an air humidifier 110. In FIG. 2 components corresponding to FIG. 1 are identified with the same reference symbols plus 100.

The air humidifier 110 differs from the air humidifier 10 in FIG. 1 merely by the device which ensures that for the treatment of the air the latter comes into contact with the water. In the exemplary embodiment in FIG. 1, this is ensured by the evaporation surface 38.

In the air humidifier 110 shown in FIG. 2, an atomising device 158 is used for this purpose. This device comprises a rotary shaft 162 which is driven by an electric motor 160 and drives an atomising plate 164 arranged in the region of the water surface 118.

The atomising plate 164 is designed in such a way that, upon its rotation, the water 114 in the reservoir 116 is finely nebulised and is sprayed into the gas space 120 of the housing 112. The air flowing through the gas space 120 takes up moisture present therein and leaves the housing 112, as humidified air 142, through the opening 130.

Other methods which can be used to atomise water are also known. This can be done, for example, by atomising the water 114 by means of ultrasound or introducing it, forced through fine nozzles, as a fine mist into the gas space 120.

Figure 3:
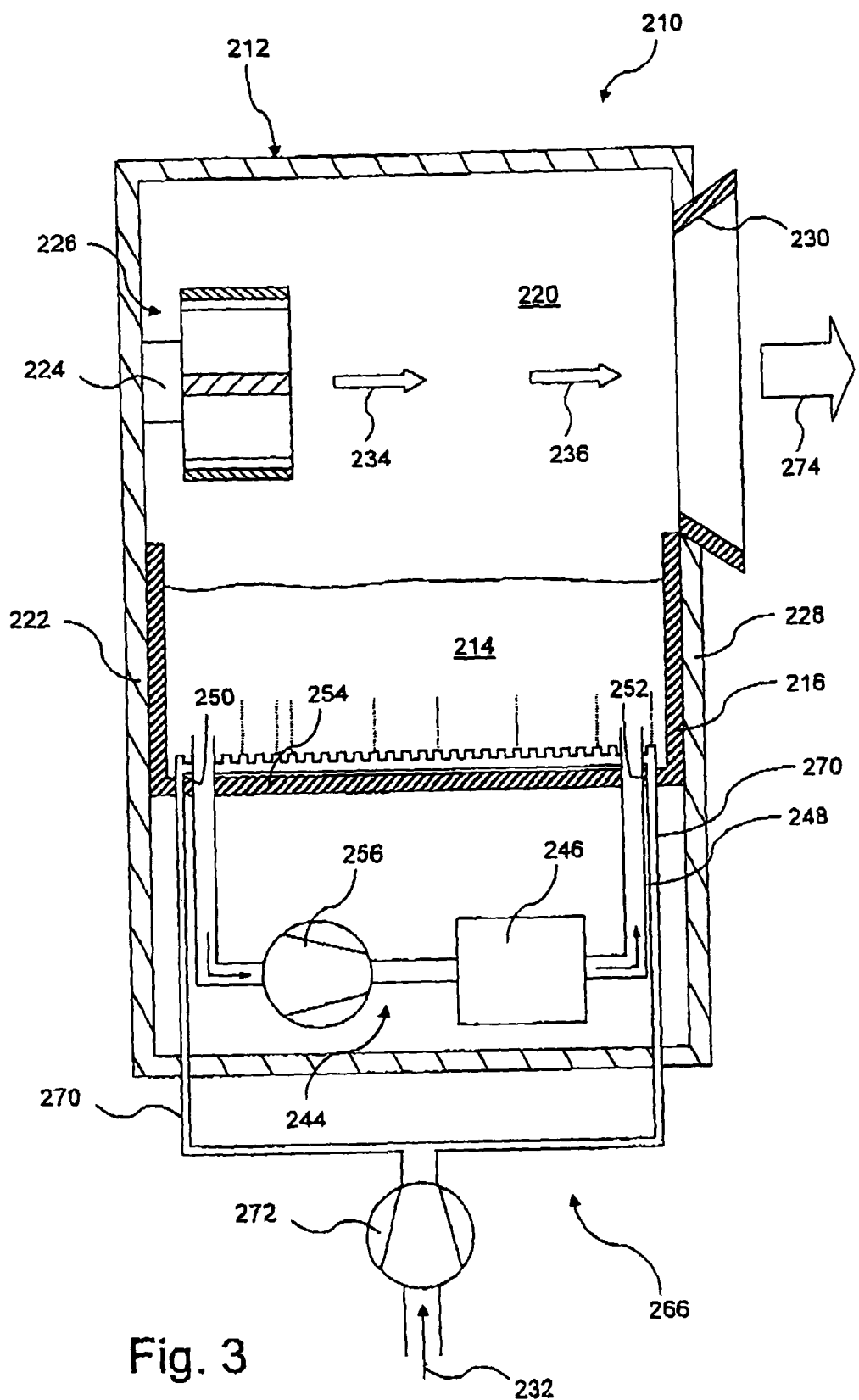

FIG. 3 shows a further exemplary embodiment of an apparatus for air treatment in the form of an air purifier 210. In FIG. 3 components corresponding to FIG. 1 are identified with the same reference symbols plus 200.

In the case of the air purifier 210, the blower 226 is accommodated completely inside the gas space 220 of the housing 212. The housing wall 222 is closed, so that the gas space 220 is not connected to the space outside the housing 212 via the blower 226.

The air purifier 210 comprises an air supply device 266, by means of which air to be purified is introduced into water 214 which has been filled into the reservoir 216. To introduce the air, a multiplicity of fine nozzles 268 are provided at the bottom 254 of the reservoir 216, to which nozzles the air is supplied via lines 270 by means of a blower 272.

The air flows through the nozzles 268 into the water 214, rises therein as air bubbles and enters the gas space 220 upwardly. In the process, the water 214 takes up impurities from the air, so that the air situated in the gas space 220 of the housing 212 is freed from impurities. The blower 226 conveys the purified air situated in the gas space 220 through the opening 230 out of the housing 212, as indicated in FIG. 3 by the arrow 274.

In contrast to the air humidifiers 10 and 110, in the air purifier 210 a liquid other than water may also be provided. For example, a suitable purifying liquid in which the impurities entrained by the air are readily soluble is to be preferred.

The air to be purified may, for example, be exhaust air, such as that arising in treatment booths of surface treatment installations in which wet separation occurs. Such a surface treatment installation is shown schematically in FIG. 4 and denoted as a whole by 376.

The surface treatment installations 376 comprise a treatment booth 378, which may, in particular, be a treatment booth for painting, coating, drying or associated preparation of metallic or nonmetallic objects, in particular vehicle bodies.

The treatment booth 378 is supplied with pure air R, which leaves the treatment booth 378 again as exhaust air A laden with impurities.

Figure 4:
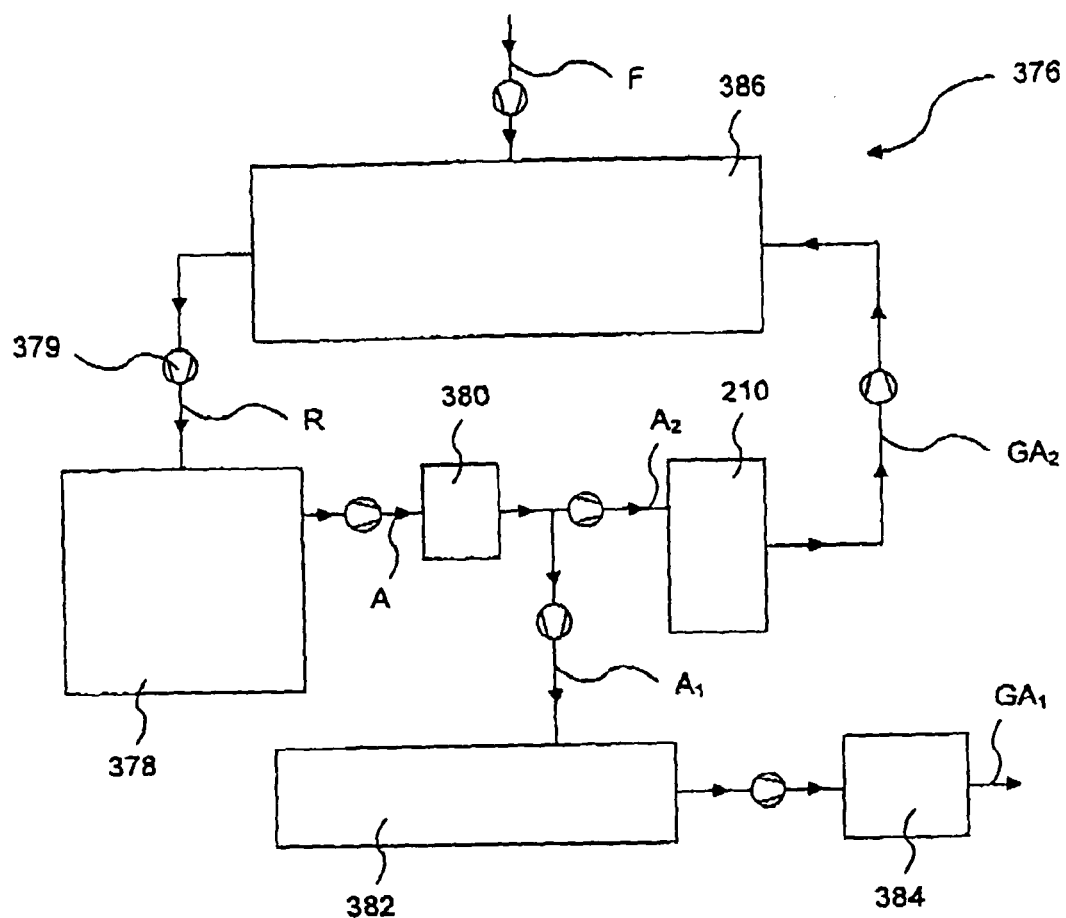

The flow direction of the respective air is illustrated in FIG. 4 by arrows, the air in each case being conveyed by blowers provided only once with the reference symbol 379.

The exhaust air A is conveyed from the treatment booth 378 to a preliminary filter 380, from where a part $A_1$ of the exhaust air A is supplied for disposal to a thermal afterburning installation 382 and from there, via a heat recovery installation 384, as purified exhaust air $GA_1$, to the environment. The preliminary filter 380 may also be a wet scrubbing device with a venturi nozzle, as is customary in paint-spraying booths.

In order to satisfy economic and environmental concerns, the amount of exhaust air to be disposed of is to be kept as low as possible. For this purpose, a part $A_2$ of the exhaust air A arising in the treatment booth 378 is fed back in a circuit to the treatment booth 378, this fed-back part $A_2$ of the exhaust air A being purified as completely as possible and mixed with fresh air F in an air-mixing installation 386 before being reintroduced into the treatment booth 378. This mixture of fresh air F and the purified fed-back exhaust-air portion $A_2$ is then supplied to the treatment booth 378 again as pure air R.

To purify the fed-back portion $A_2$ of the exhaust air A, the air purifier 210 is provided upstream of the air-mixing installation 386 in the circuit. The purified exhaust-air portion $GA_2$ from the air purifier 210 is supplied to the air-mixing installation 386.

As the exhaust air $A_2$ passes through the liquid 214 in the reservoir 216 of the air purifier 210, the liquid 214 becomes heavily contaminated, which may lead to considerable germ formation. This germ formation is greatly reduced by the electroporation device 246 in the circulating device 244 of the air purifier 210, with the result that the liquid 214 can be used longer for purifying the exhaust air $A_2$. This, in turn, is desirable from an economic and environmental point of view, since a relatively high outlay is involved in disposal of the liquid 214 when it can no longer be used. In the event of germ contamination of the liquid 214, the time when the liquid 214 must be exchanged is significantly before the end of its maximum uptake capacity with regard to the impurities contained in the exhaust air $A_2$.

Optionally, still further and also different kinds of purifying stages may be provided in the circuit of the exhaust-air portion $A_2$, although these are not illustrated here for reasons of clarity.

Figure 5:
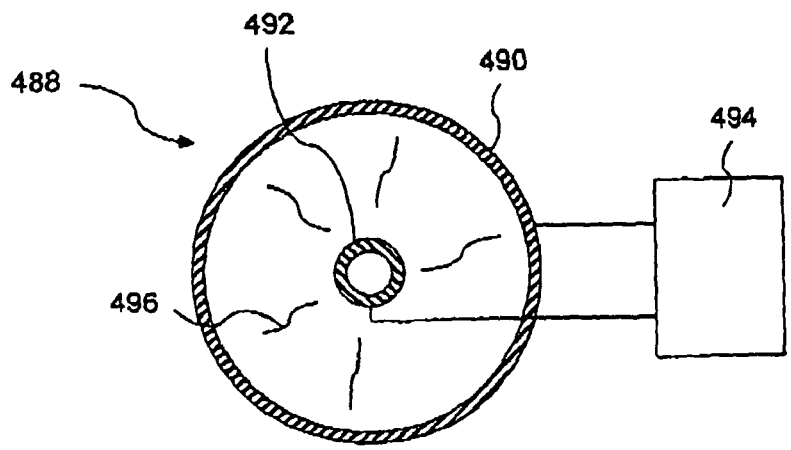

FIG. 5 shows a cross-section through essential parts of an electroporation device 488 which can be used additionally to generate corona discharges. In a first tube 490, a second tube 492 with a smaller diameter than the first tube 490 is coaxially arranged. The two tubes 490, 492 form the electrodes of the electroporation device 488. The tubes 490, 492 are connected to a pulse generator 494 which can be used to generate high-voltage pulses.

If a liquid to be sterilised flows through the interspace between the two tubes 490, 492, corona discharges are formed when sufficiently high field strengths are generated between the tubes 490, 492, these discharges being indicated by lines 496 in FIG. 5. The corona discharges 496 intensify the sterilisation of the liquid flowing through the interspace. This is because the corona discharges 496 give rise to free radicals and other chemically aggressive substances in the liquid, such as $H_2O_2$, which additionally attack the germs by chemico-biological means.

The electroporation device 488, by which corona discharges can be generated, can be used in all the above-described apparatuses for air treatment 10, 110, 210.

While specific embodiments of the present invention have been illustrated and described, numerous modifications come to mind without significantly departing from the spirit of the invention, and the scope of protection is only limited by the scope of the accompanying claims.

The invention claimed is:

1. A surface treatment installation having a least one treatment booth, in which there arises exhaust air laden with impurities that is at least partly fed back to the treatment booth in a circuit after prior treatment, wherein
   an apparatus for air treatment is provided in the circuit, the apparatus for air treatment comprising:
   a) at least one reservoir which can be filled with a liquid;
   b) an air-conveying device;
   c) a contact device which ensures that for the treatment of the air to be treated the air comes into contact with the liquid;
   d) a circulating device by which liquid in the reservoir can be conveyed in a circuit out of the reservoir and back into the latter;
   wherein
   e) for the purpose of sterilising the liquid, a device for mechanic-physical opening of cell membranes is provided in the circuit;
   f) the air to be treated can be introduced into the liquid in the reservoir by means of an air supply device or the air to be treated can be led through a nozzle with the liquid in the same flow direction.

2. The surface treatment installation of claim 1, wherein the device for mechanic-physical opening of cell membranes is an electroporation device.

3. The surface treatment installation of claim 2, wherein the operating parameters of the electroporation device are adjustable during the operation of the apparatus.

4. The surface treatment installation of claim 2, wherein corona discharges can be generated in the electroporation device.

5. The surface treatment installation of claim 1, wherein the air supply device has a multiplicity of nozzles arranged at the side wall and/or at the bottom of the reservoir.

6. The surface treatment installation of claim 1, wherein the surface treatment installation is for painting, coating, drying and associated preparation of metallic and nonmetallic objects.

* * * * *